S. WHITLEY.
Shovel Plow.
No. 30,849.
Patented Dec. 4, 1860.
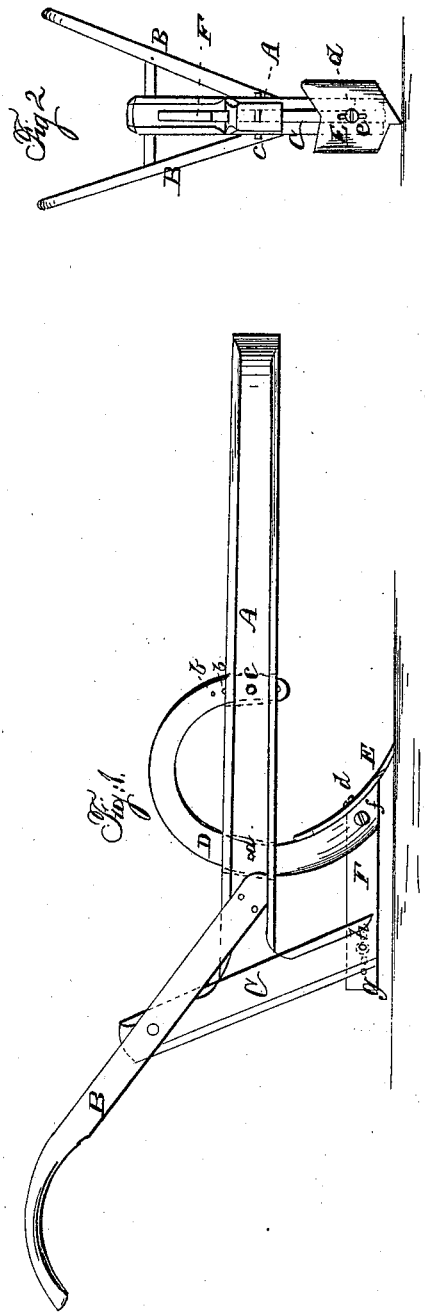

UNITED STATES PATENT OFFICE.

SMITHWICK WHITLEY, OF TALLAHASSEE, FLORIDA.

IMPROVEMENT IN PLOWS.

Specification forming part of Letters Patent No. 30,849, dated December 4, 1860.

*To all whom it may concern:*

Be it known that I, SMITHWICK WHITLEY, of Tallahassee, in the county of Leon and State of Florida, have invented a new and useful Improvement in Plows; and I do hereby declare that the following is a full, clear, and exact description of the same, reference being had to the annexed drawings, making a part of this specification, in which—

Figure 1 is a side view of my invention. Fig. 2 is a front view of the same.

Similar letters of reference indicate corresponding parts in the two figures.

A represents a beam, to which handles B B are attached; and C is a standard, which is secured to the back end of the plow-beam in a slightly inclined position from a vertical line, as shown in Fig. 1.

In the beam A a curved metal bar, D, is secured by a pivot, $a$. The upper part of this bar D, from the pivot $a$ to its outer end, is of semicircular form, and the front end of bar D is perforated with holes $b$, through either of which and the beam A a pin, $c$, passes. The lower part of the bar D extends some distance below the beam A, and is curved forward, as shown clearly in Fig. 1.

To the front side of the lower part of the bar D a share, E, is attached by a screw, $d$. This screw passes through a vertical slot, $e$, in the share E, the slot $e$, admitting of the vertical adjustment of the share, as will be fully understood by referring to Fig. 2.

To the lower end of the bar D a bar, F, is attached by a pivot, $f$, and the back end of this bar is perforated with a series of holes, $g$, through any of which a screw, $h$, passes into the standard C.

The share E may be of any of the forms usually employed for cultivating crops which are grown in hills or drills.

From the above description it will be seen that by raising the upper front end of the bar D the share E willbe moved forward and set, so as to open a shallow furrow, and that by depressing the front end of said bar D the share will be adjusted nearer a vertical position, and will consequently open a deeper furrow. The bar D is secured in the desired position by the pin $c$, and the bar F is adjusted to suit the varying position of the bar D by means of the screw $h$, which is fitted in the proper hole $g$ in the standard C. By this arrangement the bar D not only forms a ready means for adjusting or setting the share E, but also serves as a brace to stiffen the implement.

The device is extremely simple and efficient, and may be constructed at a small cost.

I do not claim adjusting the share E on the bar D by means of the screw $d$ passing through the oblong slot $e$; but I do claim as new and desire to secure by Letters Patent—

The arrangement of the circular pivoted adjustable share-foot D with the beam A, pivoted adjustable bar F, and standard C, as and for the purposes herein shown and described.

SMITHWICK WHITLEY.

Witnesses:
T. P. TATUM,
EDW. M. WEST.